(12) United States Patent
Hauck

(10) Patent No.: US 12,270,499 B2
(45) Date of Patent: Apr. 8, 2025

(54) WATER LINE JUNCTION DEVICE

(71) Applicant: ND Energy Services Management, Inc., Dickinson, ND (US)

(72) Inventor: Tobias Hauck, Dickinson, ND (US)

(73) Assignee: ND Energy Services Management, Inc., Dickinson, ND (US)

( * ) Notice: Subject to any disclaimer, the term of this patent is extended or adjusted under 35 U.S.C. 154(b) by 240 days.

(21) Appl. No.: 17/897,293

(22) Filed: Aug. 29, 2022

(65) Prior Publication Data

US 2023/0064563 A1 Mar. 2, 2023

Related U.S. Application Data

(60) Provisional application No. 63/238,257, filed on Aug. 30, 2021.

(51) Int. Cl.
| | |
|---|---|
| *F16L 39/00* | (2006.01) |
| *F16L 39/02* | (2006.01) |
| *F16L 55/16* | (2006.01) |
| *F16L 55/168* | (2006.01) |

(52) U.S. Cl.
CPC ............ *F16L 39/005* (2013.01); *F16L 39/02* (2013.01); *F16L 55/16* (2013.01); *F16L 55/168* (2013.01); *F16L 2201/30* (2013.01)

(58) Field of Classification Search
CPC ..... F16L 39/005; F16L 39/02; F16L 2201/30; F16L 39/00; F16L 37/56; F16L 37/565; F16L 59/06; F16L 55/168; F16L 55/16
See application file for complete search history.

(56) References Cited

U.S. PATENT DOCUMENTS

| | | | |
|---|---|---|---|
| 4,775,855 | A | 10/1988 | Cox |
| 4,971,477 | A | 11/1990 | Webb et al. |
| 5,054,523 | A | 10/1991 | Rink |

(Continued)

FOREIGN PATENT DOCUMENTS

| | | |
|---|---|---|
| EP | 3246610 | 11/2017 |
| KR | 101535732 B1 | 7/2015 |
| WO | 2015195164 A1 | 12/2015 |

OTHER PUBLICATIONS

International Search Report and Written Opinion for International Application No. PCT/US2022/041834, date of mailing Nov. 24, 2022, 13 total pages.

*Primary Examiner* — William S. Choi
(74) *Attorney, Agent, or Firm* — Mai D. Lauer; Westman, Champlin & Koehler P.A.

(57) ABSTRACT

A system includes first and second hose segments and a first junction device. The first hose segment includes first inner and outer hoses. The second hose segment includes second inner and outer hoses. The first junction device includes a first body including first and second chambers and a selectively openable hatch disposed on at least one of the first and second chambers. The first outer hose is fluidly connected to first chamber. The second outer hose is fluidly connected to the second chamber. The first and second inner hoses are fluidly connected. Outside of the first and second inner hoses, interiors of the first and second chambers are fluidly isolated from each other. A method of transporting liquid over land comprises connecting a first hose segment to a liquid source and connecting first and second hose segments to a first junction device.

20 Claims, 7 Drawing Sheets

(56) References Cited

U.S. PATENT DOCUMENTS

| | | | |
|---|---|---|---|
| 5,141,256 A * | 8/1992 | Ziu | F16L 39/005 |
| 5,186,502 A * | 2/1993 | Martin | F16L 39/005 |
| 5,343,738 A | 9/1994 | Skaggs | |
| 5,348,044 A | 9/1994 | Eugene et al. | |
| 5,427,474 A | 6/1995 | Silvers | |
| 5,449,204 A * | 9/1995 | Greene | F16L 39/005 |
| 5,489,124 A * | 2/1996 | Nee | |
| 5,527,130 A | 6/1996 | Webb | |
| 5,580,186 A | 12/1996 | Tassone et al. | |
| 6,082,392 A | 7/2000 | Watkins, Jr. | |
| 6,116,817 A | 9/2000 | Osborne | |
| 6,230,735 B1 | 5/2001 | Bravo | |
| 7,455,194 B2 | 11/2008 | Hutchinson | |
| 8,308,200 B1 * | 11/2012 | Barnes | F16L 39/005 |
| 8,701,467 B2 * | 4/2014 | Carns | F16L 39/005 |
| 8,820,794 B1 * | 9/2014 | Betz | F16L 39/02 |
| 8,844,977 B2 * | 9/2014 | Sodergard | |
| 8,893,742 B2 | 11/2014 | Buresi et al. | |
| 11,255,358 B1 * | 2/2022 | Srock | F16L 39/02 |
| 2008/0121304 A1 | 5/2008 | Carlier et al. | |
| 2010/0270788 A1 | 10/2010 | Takeda et al. | |

\* cited by examiner

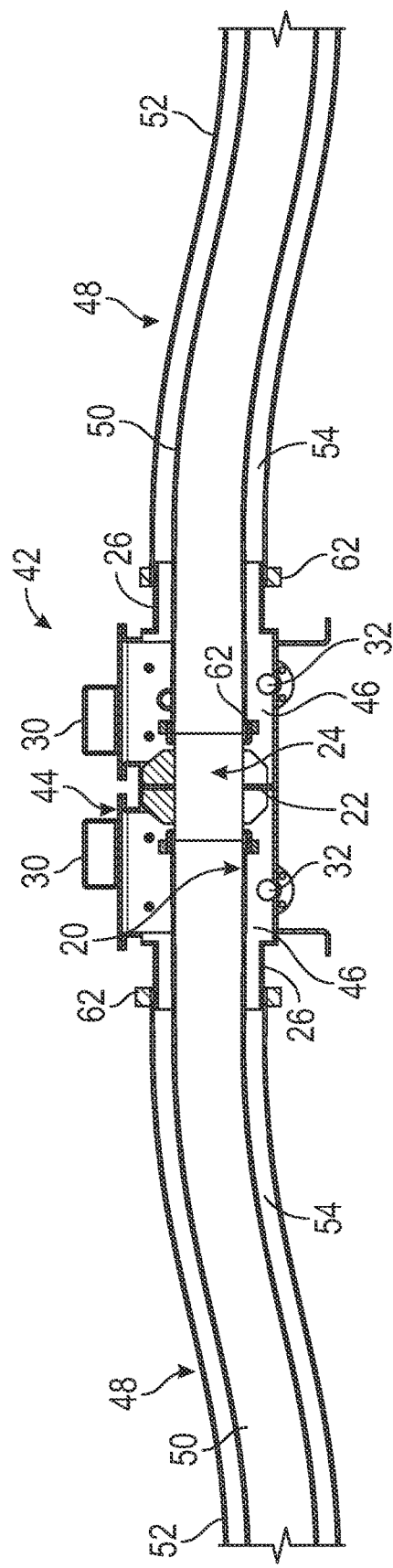
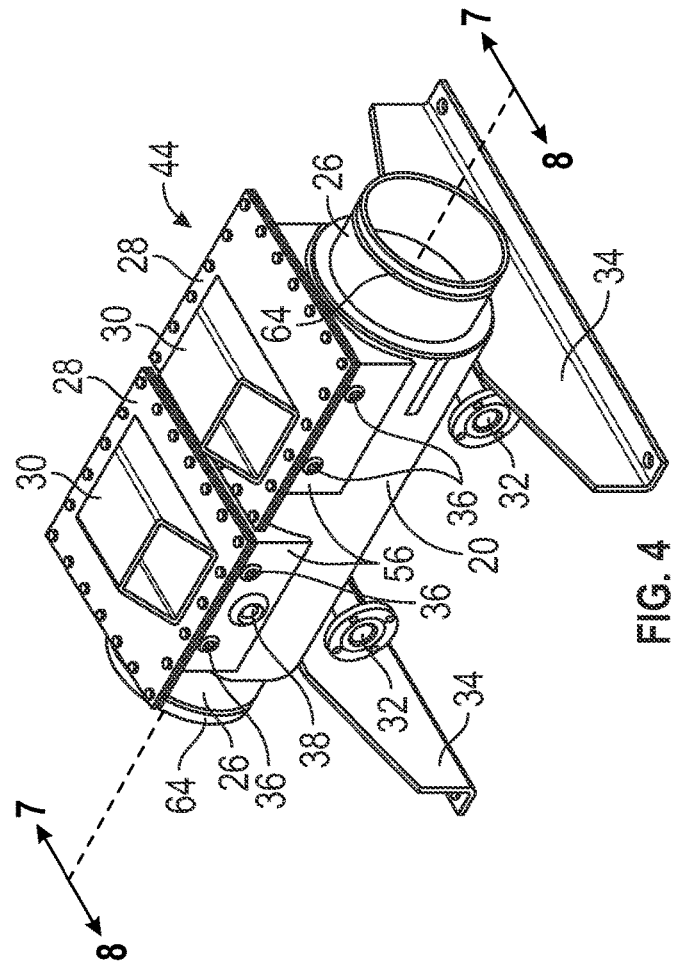

WATER LINE JUNCTION DEVICE

CROSS REFERENCE TO RELATED APPLICATIONS

This application claims the benefit of priority from U.S. Provisional Patent Application No. 63/238,257, filed Aug. 30, 2021; the content of the priority application is hereby incorporated by reference in its entirety.

BACKGROUND

In a day's fracking operation, about 400,000 gallons of water may be consumed. Currently, fresh water is primarily used. Above ground water transfer is accomplished with polyester woven lay-flat hoses and centrifugal pumps. The pumps pull from a fresh water source and transfer the fluid across the ground surface through the hose in multiple increments.

Above ground fluid transfer is commonly accomplished from a fluid source with a fluid transfer pump, which moves the fluid through piping or hose. Long fluid transfer operations require many pipes or hoses to be connected together to reach distances. As an example, in the oil and gas industry, several thousand feet, or even miles, of hose/pipe will be connected together to supply water to a new oil or gas well as a water supply for the hydraulic fracturing process. The fracturing process uses several thousands if not millions of barrels of water to complete the process.

There is new interest in using produced water, which is readily available as a byproduct of producing oil wells. However, salt water is considered a waste material, and its transfer over land is not generally permitted due to potential for leak and environmental contamination.

SUMMARY

In one aspect, a system comprises a first hose segment, a second hose segment, and a first junction device. The first hose segment comprises a first inner hose and a first outer hose. The second hose segment comprises a second inner hose and a second outer hose. The first junction device comprises a first body, the first body comprising a first chamber, a second chamber, and a selectively openable hatch disposed on at least one of the first chamber and the second chamber. The first outer hose is fluidly connected to first chamber. The second outer hose is fluidly connected to the second chamber. The first inner hose is fluidly connected to the second inner hose. Outside of the first and second inner hoses, an interior of the first chamber is fluidly isolated from an interior of the second chamber.

In another aspect, a method of transporting liquid over land comprises connecting a first hose segment to a liquid source, connecting the first hose segment to a first junction device, and connecting a second hose segment to the first junction device. Connecting the first hose segment to the first junction device comprises attaching the first outer hose to the first body. Connecting the second hose segment to the first junction device comprises attaching the second outer hose to the first body. The method comprises attaching the first inner hose to a first connection pipe and attaching the second inner hose to the first connection pipe.

This summary is provided to introduce concepts in simplified form that are further described below in the Detailed Description. This summary is not intended to identify key features or essential features of the disclosed or claimed subject matter and is not intended to describe each disclosed embodiment or every implementation of the disclosed or claimed subject matter. Specifically, features disclosed herein with respect to one embodiment may be equally applicable to another. Further, this summary is not intended to be used as an aid in determining the scope of the claimed subject matter. Many other novel advantages, features, and relationships will become apparent as this description proceeds. The figures and the description that follow more particularly exemplify illustrative embodiments.

BRIEF DESCRIPTION OF THE DRAWINGS

The disclosed subject matter will be further explained with reference to the attached figures, wherein like structure or system elements are referred to by like reference numerals throughout the several views. All descriptions are applicable to like and analogous structures throughout the several embodiments, unless otherwise specified.

FIG. 3 is cross-sectional view taken along line 3-3 of FIG. 2.

FIG. 4 is a perspective view of the exemplary water line junction device.

While the above-identified figures set forth one or more embodiments of the disclosed subject matter, other embodiments are also contemplated, as noted in the disclosure. In all cases, this disclosure presents the disclosed subject matter by way of representation and not limitation. It should be understood that numerous other modifications and embodiments can be devised by those skilled in the art that fall within the scope of the principles of this disclosure.

The figures may not be drawn to scale. In particular, some features may be enlarged relative to other features for clarity. Moreover, where terms such as above, below, over, under, top, bottom, side, right, left, vertical, horizontal, etc., are used, it is to be understood that they are used only for ease of understanding the description. It is contemplated that structures may be oriented otherwise.

DETAILED DESCRIPTION

Figure 1:
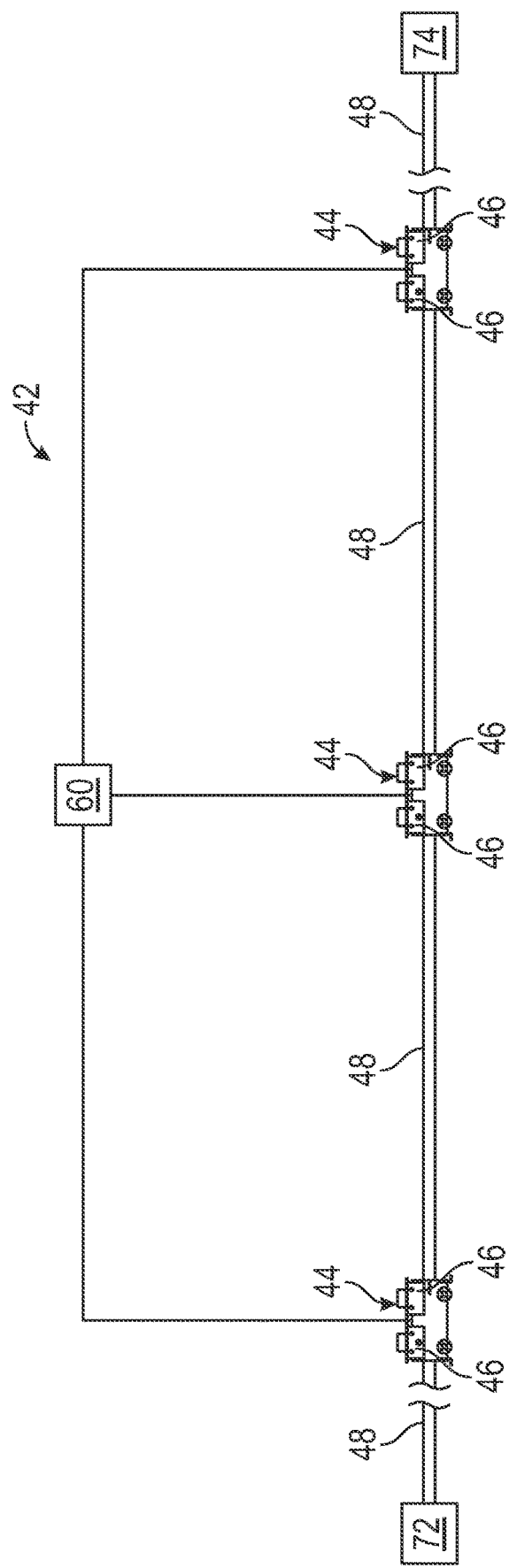
FIG. 1 is a schematic view of a water transport system having a plurality of water line junction devices between a plurality of hose segments.
Figure 2:
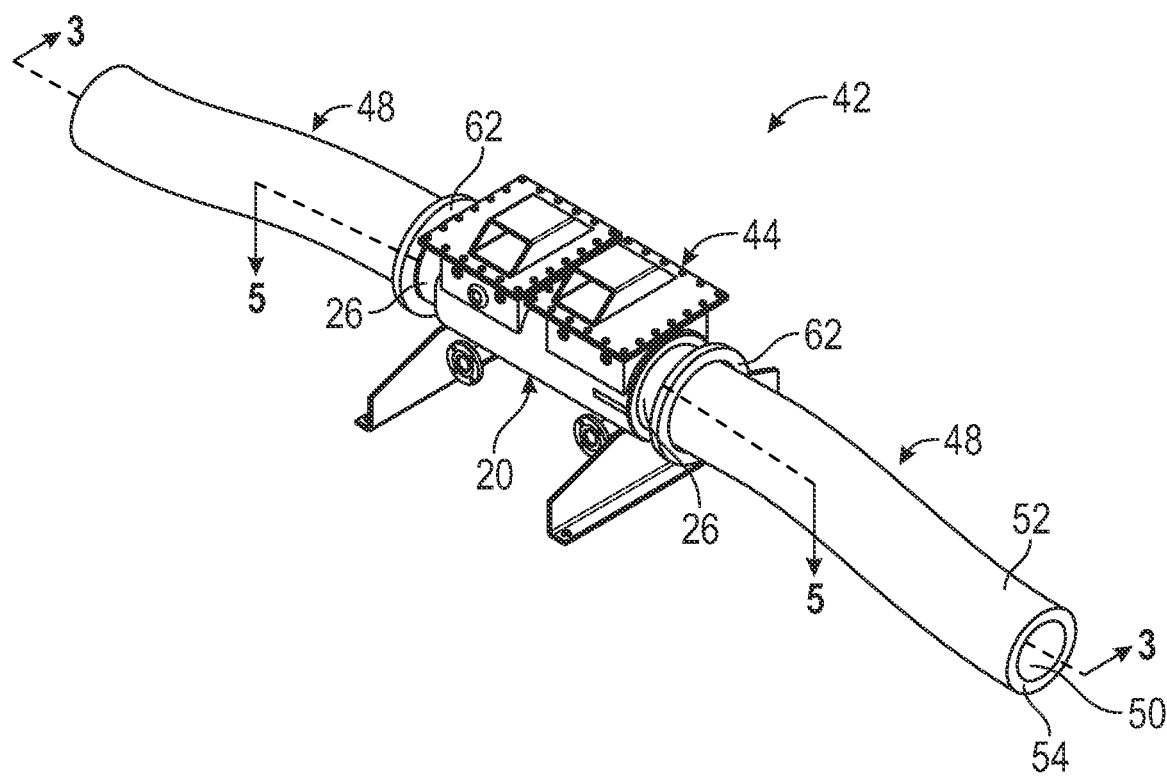
FIG. 2 is a perspective view of an exemplary water line junction device disposed between two hose segments of the system of FIG. 1.

Referring to FIGS. 1-3, a water transport system 42 uses a water line junction device 44 having two sections or chambers 46 separated by a dividing plate 22. While the description will refer to water as the fluid to be conveyed, and more particularly salt water or produced water, it is contemplated that the described system 42 can be used for the transport of any liquid. In an exemplary embodiment, the junction device 44 connects segments of double-layered flexible lay-flat hose 48, though other fluid conduits can also be used. While FIG. 1 shows a system 42 with three junction devices 44 between four sections of connected hose 48 linking liquid source 72 and liquid outlet 74, it is to be understood that any number of hose segments 48 and connecting junction devices 44 can be used in a particular implementation of system 42.

The described junction device 44 is described as a "box" in an exemplary embodiment, though it is to be understood that it can be configured and shaped in manners other than the illustrated substantially rectangular shape. In an exemplary embodiment, each hose segment is about 330 feet long (100 m) (though conduits of other lengths can also be used), and boxes 44 are provided at junctions therebetween.

Figure 5:
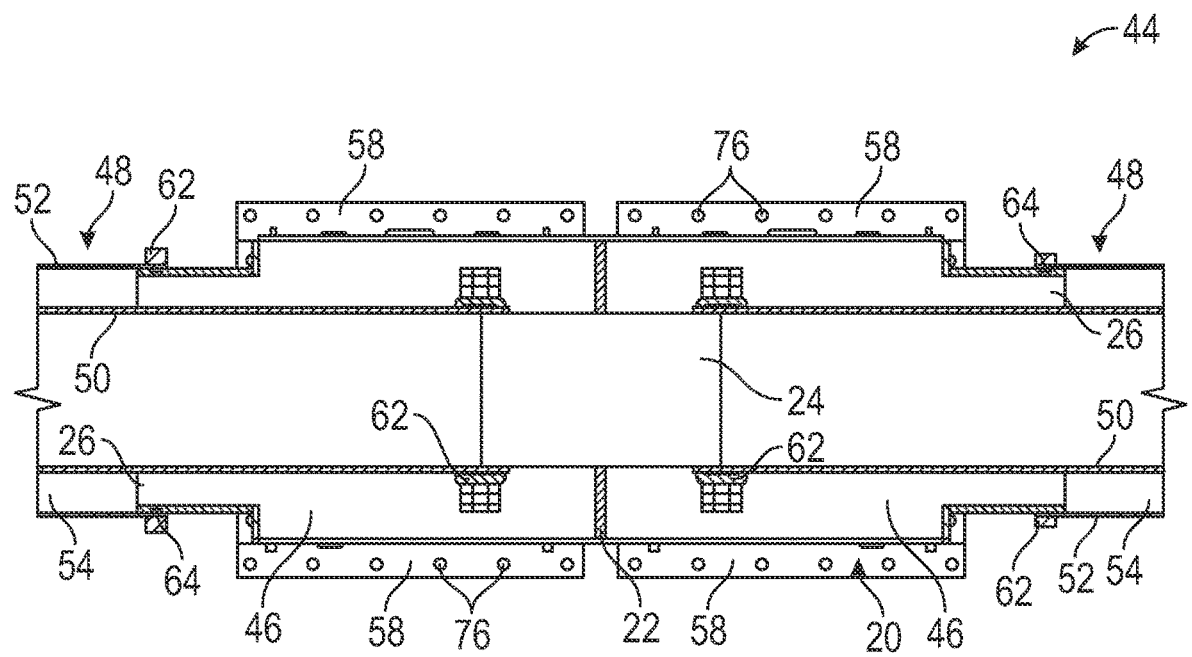
FIG. 5 is a cross-sectional view taken along line 5-5 of FIG. 2 (without feet).
Figure 6:
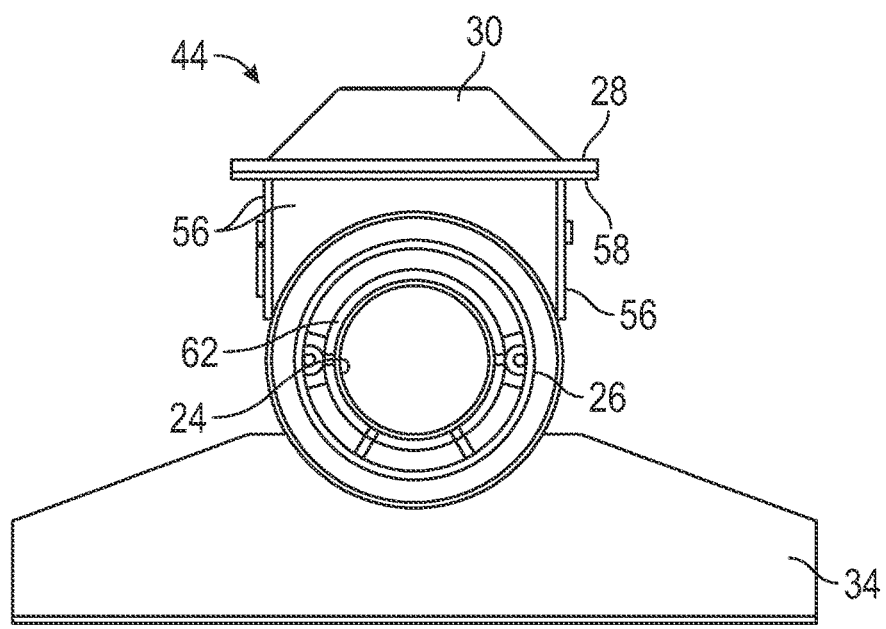
FIG. 6 is an end elevation view of the exemplary water line junction device, taken from the right side of FIG. 4.
Figure 7:
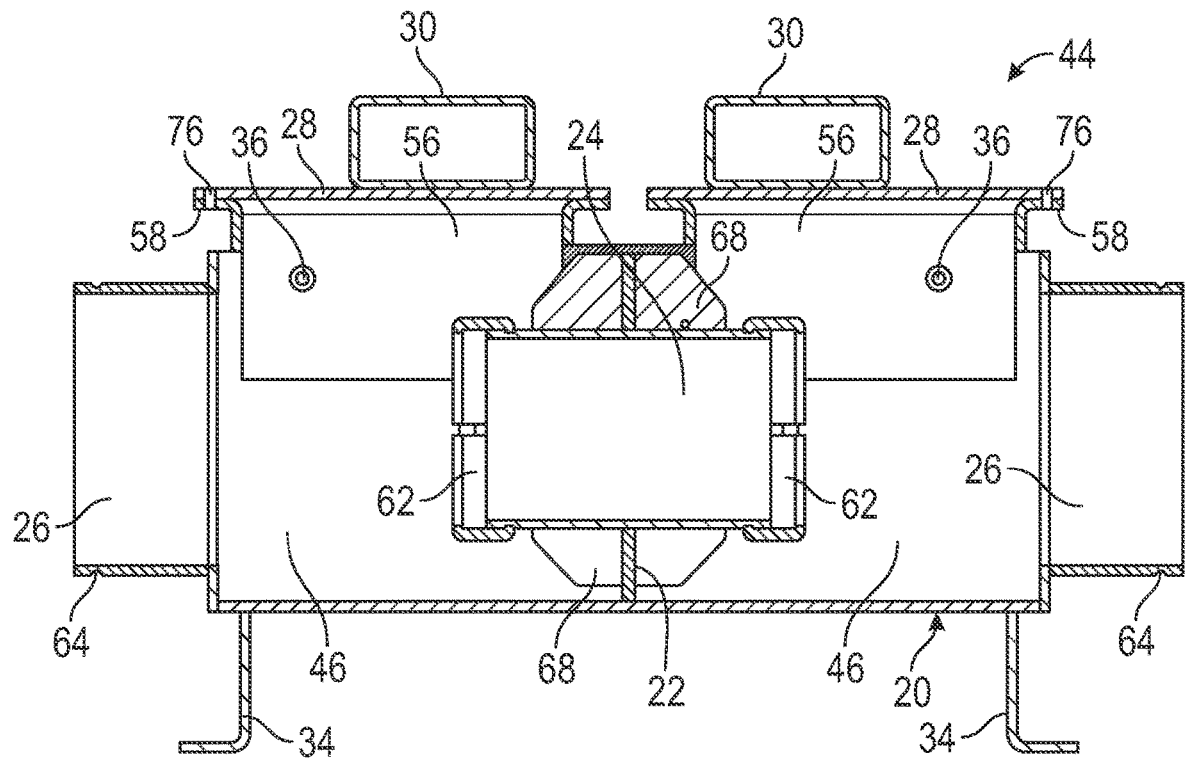
FIG. 7 is a cross-sectional view taken along line 7-7 of FIG. 4.
Figure 8:
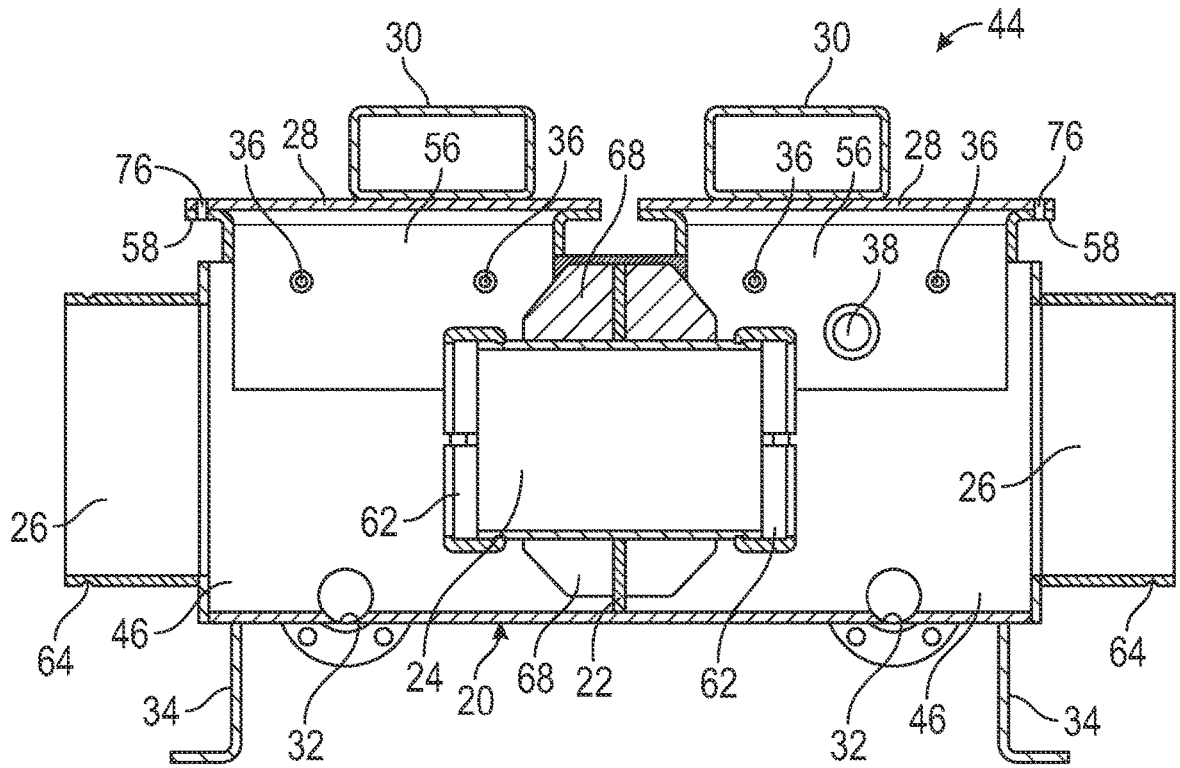
FIG. 8 is a cross-sectional view taken along line 8-8 of FIG. 4.
Figure 9:
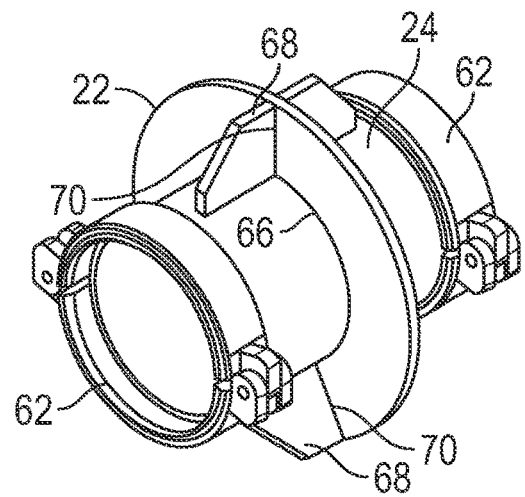
FIG. 9 is a perspective view of an internal primary line connection assembly.
Figure 10:
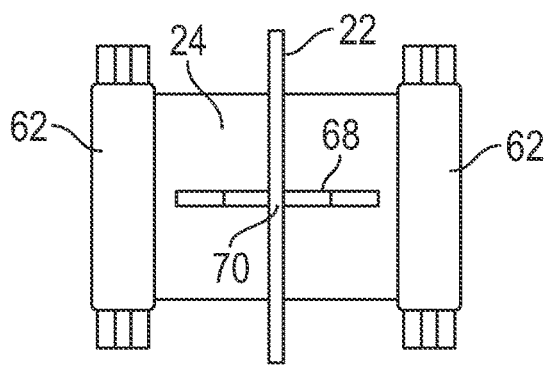
FIG. 10 is a top view of the assembly of FIG. 9.

FIG. 2 is a perspective view of an exemplary water line junction device 44 disposed between two hose segments 48 of system 42. FIG. 3 is cross-sectional view taken along line 3-3 of FIG. 2. FIG. 5 is a cross-sectional view taken along line 5-5 of FIG. 2 (without feet 34). In an exemplary embodiment, each hose 48 has an inner pipe 50 (having an 8 inch (20.32 cm) diameter, for example) and an outer pipe 52 (having a 12 inch (30.48 cm) diameter, for example). The inner pipe 50 connects to internal connection pipe 24 (having an 8 inch (20.32 cm) diameter, for example) (shown in FIGS. 3, 5-10 and 12, for example), and is therefore part of a continuous fluid conduit that extends along the entire span of transport system 42. However, the outer pipe 52 extends only between adjacent boxes 44 at sleeves 26 (having a 12 inch (30.48 cm) diameter, for example).

Figure 14:
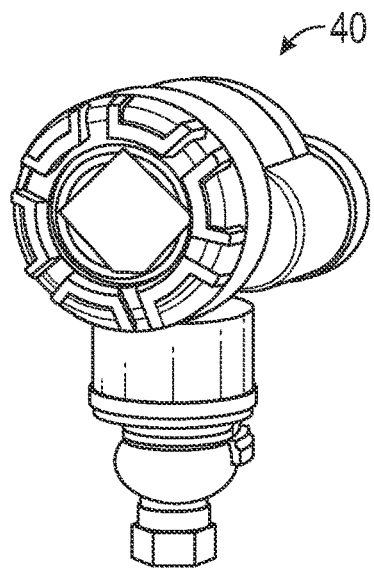
FIG. 14 is a perspective view of an exemplary sensor.

The inner pipe 50 carries produced water, which is typically salt water, and the outer pipe 52 is initially empty. However, if there is a leak of the inner pipe 50, the water will flow to annulus 54 within the surrounding outer pipe 52 and flow into box sections 46 at each end of the outer pipe 52. One suitable leak detection method uses a transducer or sensor 40 (shown in FIG. 14), which in one embodiment is a pressure gauge installed at an access port 36 on the respective box section 46. Another leak detection method involves viewing the leaked fluid (as visible water) through a window or sight glass 38 in a wall 56 or hatch 28 of the section 46. In an exemplary embodiment, the two sections 46 of a single junction device 44 are isolated from each other by dividing plate 22, so that a leak of one segment of hose 48 is contained and does not spread to other outer pipes 52.

In the case of a leak, water flow is stopped at the source 72. Each section 46 includes a discharge opening 32 through which the leaked water can be drained to a suitable disposal tank or other location. The components of system 42 can be flushed with fresh water injected into the discharge openings 32. The affected inner pipe 50 and outer pipe 52 can be removed and replaced without having to replace the entire length of connected pipes 48 of system 42.

Thus, water line junction device 44 is designed to provide secondary containment in overland fluid transfer operations. Its use reduces environmental risk or impact from salt water or other liquid leakage while allowing for overground transport of the fluid through a pipe or hose. This is achieved by creating an avenue for the fluid to be transferred though a primary (inner) hose 50 within a secondary (outer) hose 52 and enclosing all connections of the primary line 50 within a containment junction device 44, while incorporating leak and/or atmospheric condition detection means such as sight glass(es) 38 and sensor(s) 40, for example. The described water transport system 42 limits the volume of fluid that can leak from the primary hose 50 and minimizes downtime to remedy a leaking line. In referring to parts 48, 50 and 52, this description may refer to a line, hose, hose segment, or pipe, for example. These terms are not limited to any particular structure but instead connote a conduit capable of containing a liquid. In an exemplary embodiment, hose 48 is a flexible double-walled lay-flat hose that can be flattened and coiled onto a spool for storage and transport.

Current practice for overland fluid transfer typically involves a single walled hose or pipe in which the fluid is transferred. This practice has little leak protection. Typically, leak or spill detection is determined passively by monitoring a volume of "fluid in" versus "fluid out." If a secondary line is incorporated into this design, the secondary line would contain the fluid lost from the primary line; however, it is generally not possible to determine if the primary line is leaking until the secondary line is deconstructed. Another disadvantage is that the spilled fluid from the primary line would leak into the entire length of the secondary line. Therefore, if a leak occurs, the entire line would be deconstructed and a new or replacement line would be installed.

Returning to the disclosed system 42, a benefit is that an annulus 54 (space between the primary line 50 and secondary line 52) of each hose segment 48 is isolated between sections 46 of adjacent junction devices 44. Therefore, if a leak develops in the primary line 50, the spilled fluid is contained within the secondary line 52 and limited to the length of hose 48 between junction devices 44. In an exemplary embodiment, this isolation is provided by a barrier wall or dividing plate 22 separating one section 46 from the section 46 on the other side of divider 22. Thus, the leaked volume is confined, thereby limiting the amount of fluid that can escape the primary line 50, as well as minimizing the length of hose 48 that would be repaired or replaced.

To aid in leak detection, junction device 44 includes several access ports 36. Monitoring equipment, including sensors 40 such as analog and/or digital pressure gauges, temperature sensors, fluid detection sensors and/or sight glass 38, for example, can be attached to and/or through one of the available ports 36. The monitoring equipment may include telemetry capabilities for transmission to a central monitoring station. Therefore, any leaks can be detected and promptly rectified. Moreover, the junction device 44 provides security that any leaked fluids from the primary line 50 will be contained within the secondary line 52 and connected chamber sections 46, any leaked fluids from fittings will be caught in the device 44, and leaked fluid volume is minimized to the space of the annulus 54 and chamber sections 46 between two adjacent devices 44.

In an exemplary embodiment, device 44 features multiple threaded access ports 36 for each section chamber 46, such as on wall 56. Placing the access ports 36 near a top of the chamber 46 prevents imminent flooding of the ports 36 when leaked liquid is first introduced into the chamber 46. Unused ports 36 may be plugged. These ports 36 allow for connection of equipment for monitoring the atmosphere of the annulus 54 and/or chamber 46 and/or to verify the integrity of the device 44 and primary line 50 and/or secondary line 52. Monitoring equipment 38, 40 could include but is not limited to commercially available digital pressure transducers, analog pressure gauges, sight glasses, and pressure relief needle valves. For example, to verify the integrity of the secondary line 52 and the device 44, the user can install an air coupler nipple to a needle valve to pneumatically test and monitor from an analog gauge.

A suitable digital pressure transducer 40 is the Rosemount 2051 In-Line Pressure Transmitter. This product utilizes a wireless mesh network to relay the signal from the transmitters to a central receive/monitoring station 60, labeled in FIG. 1. The mesh network allows all transmitters to communicate with each other, versus each transmitter individually communicating or transmitting point-to-point to the monitoring station. The mesh network thus provides more reliable coverage, especially in areas where the line of sight from a transmitter to the monitoring station may be obstructed. Mesh networks are "self-healing," since the network automatically finds the fastest and most reliable paths on which to send data, even if nodes are blocked or lose their signal. The wireless pressure transducers will allow for constant pressure monitoring of all devices in the system 42.

In an exemplary embodiment, sight glass 38 allows for visual leak detection should the primary line 50 leak into the secondary line 52. As the interior of a chamber 46 is filled from the leaking fluid of the primary line 50 into the annulus 54 between the lines 50, 52 and in turn into the chamber 46, the liquid level can be seen. In an exemplary embodiment, the design of the sight glass 38 includes a translucent etched glass that allows a more distinct acuity for the detection of fluids, even in the absence of light in the chamber 46. The etched glass reflects external light, making the presence of fluid more visible. A suitable sight glass 38 is a commercially available product from LJ STAR Inc. with model number: MET61-150S REFLEX.

In an exemplary embodiment, near the bottom of each section chamber 46 is a 2-inch opening 32 that is flanged on the exterior of the junction device 44. During normal operation, this opening would be blinded or sealed to prevent fluid or air from escaping from the junction device 44. However, in case of a fluid leak, a drain hose can be connected to opening 32 for removal or any fluids that may have leaked into the respective section chamber 46 from annulus 54 or from the primary line 50.

The openings 32 also permit the user to safely clear and or flush the annulus 54 free of any non-environmentally friendly fluids that may have leaked into the annulus 54 from the primary line 50. The user can connect to the flanged opening 32 on the affected section chamber 46 of the junction device 44 and clear the annulus 54 by applying a vacuum. Alternatively, the user can pump environmentally safe fluid through the flanged opening 32 on the affected section chamber 46 and collect the flushed fluids from the opening 32 of the section 46 connected to the other end of the annulus 54.

Figure 11:
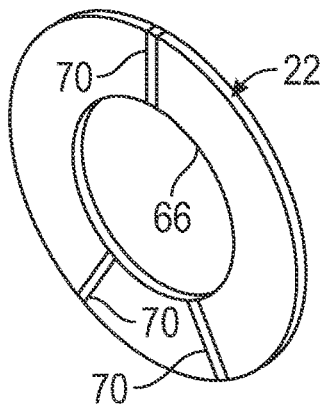
FIG. 11 is a perspective view of an exemplary dividing plate.
Figure 12:
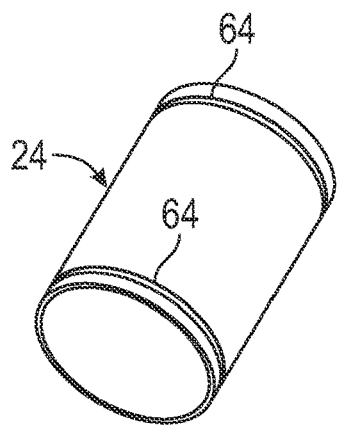
FIG. 12 is a perspective view of an exemplary internal primary line connection pipe.
Figure 13:
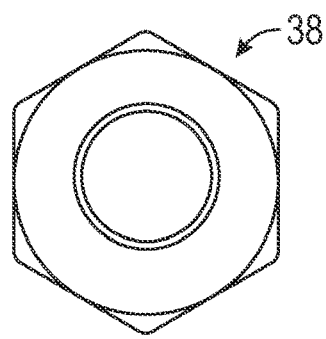
FIG. 13 is a front view of an exemplary sight glass.

In an exemplary embodiment, junction device 44 includes a generally cylindrical body 20 having two distinct internal chambers 46 separated by a steel plate 22. The separation plate 22 serves to prevent the atmosphere or fluids from one chamber 46 to flow into the adjacent chamber 46 of the same junction device 44 when two primary lines 50 are connected to the internal pipe 24. An internal connection pipe 24 is shown in FIGS. 3, 5-10 and 12, for example. When a primary line 50 is attached to connection pipe 24 on either side of plate 22, a continuous pathway is formed, through which the transferred fluid may flow through the junction device 44. In an exemplary embodiment, each primary hose 50 is secured to connection pipe 24 by clamp ring 62 at groove 64 (visible in FIG. 12). As shown in FIG. 11, dividing plate 22 is configured with a circular annular shape with an outer circumference that closely fits the interior cylindrical dimension of device body 20. A central, circular aperture 66 is dimensioned to fit closely around the diameter of connection pipe 24. Locating flanges 68 are attached at radially spaced positions 70 to hold connection pipe 24 securely within body 20.

The primary line 50 enters the device 44 through larger sleeves 26 at each end of the device 44. These sleeves 26 allow a secondary line/pipe/hose 52 to be connected to the device 44. In an exemplary embodiment, each substantially cylindrical hose connection sleeve 26 is secured to the body 20 by a welded joint and includes a groove 64 for the use of a hose clamp ring 62.

In an exemplary embodiment, substantially vertical walls 56 extend upward from the cylindrical body 20 to terminate at a substantially rectangular top opening of each section chamber 46. In an exemplary embodiment, the top opening of chamber 46 is equipped with a movable hatch 28. This allows user access to the internal connection pipe 24 to aid in securing the primary lines 50 to the device 44. In an exemplary embodiment, a gasket (not shown) is provided between the hatch 28 and the walls 56 to prevent fluids or air from escaping. In an exemplary embodiment, the hatch 28 is secured to the walls 56 by several fasteners (such as bolts, for example) evenly spaced around the perimeter, the bolts oriented vertically through aligned apertures 76 of hatch 28 and flange 58 at the top of the walls 56. In an exemplary embodiment, the top of each hatch 28 also features a fork pocket 30. The fork pockets 30 are configured and spaced to receive the tines of a fork lift or loader, allowing a user to lift the device 44 when both hatches 28 are secured in a closed position. In an exemplary embodiment, the body 20 is elevated off a ground surface by integrated feet 34. The feet 34 provide clearance for the flanges of the bottom openings 32.

Non-limiting, exemplary embodiments of a system and method are described. In an exemplary embodiment, a system 42 comprises a first hose segment 48, a second hose segment 48, a first junction device 44. The first hose segment 48 comprises a first inner hose 50 and a first outer hose 52. The second hose segment 48 comprises a second inner hose 50 and a second outer hose 52. The first junction device 44 comprises a first body 20, the first body comprising a first chamber 46 and a second chamber 46 and a selectively openable hatch 28 disposed on at least one of the first chamber 46 and the second chamber 46. The first outer hose 52 is fluidly connected to first chamber 46. The second outer hose 52 is fluidly connected to the second chamber 46. The first inner hose 50 is fluidly connected to the second inner hose 50. Outside of the first and second inner hoses 50, an interior of the first chamber 46 is fluidly isolated from an interior of the second chamber 46.

In an exemplary embodiment, a connection pipe 24 fluidly connects the first inner hose 50 and the second inner hose 50. In an exemplary embodiment, at least one of the first and second hose segments 48 comprises a lay-flat flexible hose. In an exemplary embodiment, a foot 34 is configured to support the first body 20 above a ground surface. In an exemplary embodiment, a third hose segment 48 comprises a third inner hose 50 and a third outer hose 52. A second junction device 44 comprises a second body 20. The second body 20 comprises a third chamber 46 and a fourth chamber 46. The second outer hose 52 is fluidly connected to third chamber 46, and the second inner hose 50 is fluidly connected to the third inner hose 50.

In an exemplary embodiment, a dividing plate 22 fluidly isolates the interior of the first chamber 46 from the interior of the second chamber 46. In an exemplary embodiment, the hatch 28 comprises a fork pocket 30. In an exemplary embodiment, at least one of the first chamber 46 and the second chamber 46 comprises a sensor 40. In an exemplary embodiment, at least one of the first chamber 46 and the second chamber 46 comprises a sight glass 38. In an exemplary embodiment, at least one of the first chamber 46 and the second chamber 46 comprises a discharge opening 32 proximate a bottom of the respective chamber 46.

In an exemplary embodiment, a method of transporting liquid over land comprises connecting a first hose segment 48 to a liquid source 72 (such as a source of produced water from a production oil well, for example), connecting the first hose segment 48 to a first junction device 44, and connecting a second hose segment 48 to the first junction device 44. In an exemplary embodiment, the first hose segment 48 comprises a first inner hose 50 and a first outer hose 52. In an exemplary embodiment, connecting the first hose segment 48 to the first junction device 44 comprises attaching the first outer hose 52 to the first body 20. In an exemplary embodiment, connecting the second hose segment 48 to the first junction device 44 comprises attaching the second outer hose 52 to the first body 20. In an exemplary embodiment, the method comprises attaching the first inner hose 50 to a first connection pipe 24 and attaching the second inner hose 50 to the first connection pipe 24.

In an exemplary embodiment, the method comprises closing a hatch 28 of at least one of the first chamber 46 and the second chamber 46. In an exemplary embodiment, the method comprises lifting the first junction device 44 by insertion of a fork lift tine through a fork pocket 30 attached to the hatch 28. In an exemplary embodiment, the method comprises directing liquid from the liquid source 72, through the first inner hose 50, though the second inner house 50, and to a liquid outlet 74 (at an opposite end of the connected hoses 48 of system 42 from the liquid source 72), while the first and second outer hoses 52 do not have liquid in an annulus 54 outside of the first and second inner hoses 50. In an exemplary embodiment, the method comprises detecting a leak from at least one of the first and second inner hoses 50 into the annulus 54 by detection of liquid in at least one of the first chamber 46 and the second chamber 46. In an exemplary embodiment, detecting the leak comprises sensing a change in pressure in at least one of the first chamber 46 and the second chamber 46. In an exemplary embodiment, detecting the leak comprises visually seeing liquid in at least one of the first chamber 46 and the second chamber 46.

In an exemplary embodiment, the method comprises draining the liquid from at least one of the first chamber 46 and the second chamber 46. In an exemplary embodiment, draining the liquid comprises attaching a third hose segment (not shown) to a discharge opening 32 of at least one of the first chamber 46 and second chamber 46. In an exemplary embodiment, the method comprises connecting the second hose segment 48 to a second junction device 44. In an exemplary embodiment, the method comprises attaching the second outer hose 52 to the second body 20 and attaching the second inner hose 50 to the second connection pipe 24. In an exemplary embodiment, the method comprises connecting a third hose segment 48 to the second junction device 44, comprising attaching the third outer hose 52 to the second body 20 and attaching the third inner hose 50 to the second connection pipe 24. In an exemplary embodiment, the method comprises unrolling the first hose segment 48 from a spool before connecting the first hose segment 48 to the first junction device 44.

Although the subject of this disclosure has been described with reference to several embodiments, workers skilled in the art will recognize that changes may be made in form and detail without departing from the scope of the disclosure. In addition, any feature disclosed with respect to one embodiment may be incorporated in another embodiment, and vice-versa.

The invention claimed is:

1. A system comprising:
    a first hose segment comprising a first inner hose and a first outer hose;
    a second hose segment comprising a second inner hose and a second outer hose; and
    a first junction device comprising:
        a first body, the first body comprising a first chamber and a second chamber; and
        a selectively openable hatch disposed on each of the first chamber and the second chamber;
    wherein:
        the first outer hose is fluidly connected to first chamber;
        the second outer hose is fluidly connected to the second chamber;
        the first inner hose is fluidly connected to the second inner hose; and
        outside of the first and second inner hoses, an interior of the first chamber is fluidly isolated from an interior of the second chamber.

2. The system of claim 1 comprising a connection pipe that fluidly connects the first inner hose and the second inner hose.

3. The system of claim 2 comprising a dividing plate disposed around the connection pipe that fluidly isolates the interior of the first chamber from the interior of the second chamber.

4. The system of claim 3 comprising a pair of flanges, wherein each of the pair of flanges is disposed on opposed sides of the dividing plate.

5. The system of claim 4, wherein each of the pair of flanges extends radially from the connection pipe.

6. The system of claim 4, wherein the pair of flanges is one of a plurality of pairs of flanges, and wherein the plurality of pairs of flanges are spaced around the connection pipe.

7. The system of claim 1 comprising a foot configured to support the first body above a ground surface.

8. The system of claim 1 comprising:
    a third hose segment comprising a third inner hose and a third outer hose; and
    a second junction device comprising a second body, the second body comprising a third chamber and a fourth chamber; and
    wherein:
        the second outer hose is fluidly connected to third chamber; and
        the second inner hose is fluidly connected to the third inner hose.

9. The system of claim 1 wherein at least one of the first chamber and the second chamber comprises a sensor.

10. The system of claim 1 wherein at least one of the first chamber and the second chamber comprises a sight glass.

11. The system of claim 1 wherein at least one of the first chamber and the second chamber comprises a discharge opening proximate a bottom of the respective chamber.

12. The system of claim 1, wherein at least one of the first and second chambers comprises a plurality of vertical walls.

13. The system of claim 12, wherein the plurality of vertical walls form a rectangular opening.

14. The system of claim 13, wherein the openable hatch is configured for removable attachment to the rectangular opening.

15. A system comprising
a first hose segment comprising a first inner hose and a first outer hose;
a second hose segment comprising a second inner hose and a second outer hose; and
a first junction device comprising:
- a first body, the first body comprising a first chamber and a second chamber; and
- a selectively openable hatch disposed on at least one of the first chamber and the second chamber, wherein the hatch comprises a fork pocket;

wherein:
- the first outer hose is fluidly connected to first chambers
- the second outer hose is fluidly connected to the second chamber;
- the first inner hose is fluidly connected to the second inner hose; and
- outside of the first and second inner hoses, an interior of the first chamber is fluidly isolated from an interior of the second chamber.

16. The system of claim 15, wherein at least one of the first chamber and the second chamber comprises a sensor.

17. The system of claim 15, wherein at least one of the first chamber and the second chamber comprises a sight glass.

18. The system of claim 15, wherein at least one of the first chamber and the second chamber comprises a discharge opening proximate a bottom of the respective chamber.

19. The system of claim 15 comprising:
- a connection pipe that fluidly connects the first inner hose and the second inner hose;
- a dividing plate disposed around the connection pipe that fluidly isolates the interior of the first chamber from the interior of the second chamber; and
- a pair of flanges, wherein each of the pair of flanges is disposed on opposed sides of the dividing plate.

20. The system of claim 15, wherein at least one of the first and second chambers comprises a plurality of vertical walls.

* * * * *